United States Patent

[11] 3,599,034

[72] Inventors Walter A. Fischer, Jr.
Dover;
Robert Coultas, Madison; Arthur Nichols,
Cedar Grove, all of, N.J.

[21] Appl. No. 819,239
[22] Filed Apr. 25, 1969
[45] Patented Aug. 10, 1971
[73] Assignee Dumont Oscilloscope Laboratories, Inc.
West Caldwell, N.J.

[54] CONTROLLED DISPLAY OF WAVEFORMS
13 Claims, 5 Drawing Figs.

[52] U.S. Cl. .................................................... 315/26, 315/25
[51] Int. Cl. .................................................... H01j 29/74
[50] Field of Search .................................................... 315/19, 26, 25

[56] References Cited

UNITED STATES PATENTS

| | | | |
|---|---|---|---|
| 2,439,050 | 4/1948 | Mallory | 315/26 |
| 2,444,338 | 6/1948 | Dimond | 315/26 |
| 2,962,625 | 11/1960 | Berwin et al. | 315/26 |

OTHER REFERENCES

Dual Trace Scope With Seperate Sweeps, Cann, IBM Tech. Disclosure March, 1965.

*Primary Examiner*—Rodney D. Bennett, Jr.
*Assistant Examiner*—Brian L. Ribando
*Attorney*—Popper, Bain, Bobis and Gilfillan

ABSTRACT: A system for the display of waveforms in which vertical deflection signals derived from one or more inputs are applied to a cathode-ray tube through a switchable, vertical deflection modulator; and trigger signals, also originating with respect to the inputs, act upon a horizontal deflection circuit of the cathode-ray tube through a switchable trigger modulator.

For each input there is a signaling channel that includes a constituent of the vertical deflection modulator and an associated constituted of the trigger modulator. The switching of the modulator constituents is governed by the settings of a mode-control logic network to determine the way in which the inputs are displayed by the cathode-ray tube, as well as the origin of the trigger signals that are used in synchronizing the horizontal deflection circuit.

As disclosed, there are two distinctive input channels and five modes of operation. For operation in the first mode, the first channel is active, and the second channel is deactivated. Conversely in the second mode of operation, the second channel is active and the first channel is deactivated.

In a third, so-called "alternate" mode of operation, the display is switched between the first and second channels. Vertical position controls in the vertical deflection modulator are adjusted to bring about the desired separation of the traces on the face of the cathode-ray tube, and the input level at which triggering takes place is determined by the setting of a trigger level control. Since the trigger circuitry operates independently of the vertical deflection circuitry, the settings of the vertical position controls do not affect the triggering level.

The remaining, fourth and fifth modes of operation permit either a "chopped" or an additive display of the inputs.

INVENTORS
WALTER A. FISCHER JR.
ROBERT COULTAS
ARTHUR NICHOLS

BY Popper, Bain & Bobis
ATTORNEYS

CONTROLLED DISPLAY OF WAVEFORMS

BACKGROUND OF THE INVENTION

This invention relates to the representation of waveforms and more particularly to the controlled display of multichannel waveforms.

Waveforms are commonly represented using a device in which a recurrent sweep is simultaneously subjected to orthogonal movement in accordance with a parameter, such as amplitude, of an applied input. Thus, with an oscilloscope a recurrent, horizontally deflected beam of electrons in a cathode-ray tube is simultaneously subjected to a vertical deflection determined by the strength of an applied signal. The vertical deflection is in accordance with the amplitude characteristic of the input, while the horizontal deflection represents the time characteristic. The result is a luminescent trace on the face of the cathode-ray tube representing the waveform of the input. For example, in the case of cyclic variations of amplitude with time, such as afforded by a conventional alternating current input signal, the displayed waveform is sinusoidal.

To afford flexibility in the use of a display device various controls are provided for the axes of display. The deflection circuitry for the vertical axis of an oscilloscope includes adjustments for the size and orientation of the display. Another vertical axis control governs the position of the display on the face of the cathode-ray tube.

For the horizontal axis, the sweep which represents the time characteristic of the display is desirably synchronizable with respect to the applied input. For that purpose, a replica of the input is used to produce pulse signals which initiate, i.e. "-trigger," each horizontal sweep of the electron beam. A trigger level control is provided so that the triggering takes place with respect to a prescribed amplitude level of the input.

With many commonly employed display systems, a change in the setting of one control in the system can affect an aspect of the display that is nominally governed by another control. Thus, in an oscilloscope of the kind shown in U.S. Pat. No. 3,204,144, an adjustment in the position of a trace on the face of the scope causes unwanted changes in the preset level at which triggering takes place, and it becomes necessary to readjust the trigger level control each time a shift is made in trace position.

Accordingly it is an object of the invention to facilitate the control of devices used in representing the waveforms of applied inputs. Another object is to prevent a change in the setting of a control for the display of waveforms from interfering with the effect of another control. A related object is to prevent adjustments in a position control of a cathode-ray oscilloscope from interfering with the operation of a trigger level control.

It is often desirable to use a display device to compare waveforms originating at different sources. This can be done by using separate devices or by employing a device, such as a dual-beam oscilloscope, which produces a simultaneous plurality of traces. These arrangements are cumbersome and needlessly costly and complex.

Accordingly, some oscilloscopes are arranged to display more than one input for each electron beam. Where there are two channels, the traces produced by the beam alternate between them and triggering takes place with respect to the vertical deflection signals. The traces are separated by using the position controls in the different channels. However, the switching of the channels, coupled with the desired separation of the traces, can have undesirable effects. As the separation of the traces increases, the trigger circuitry is less able to recover at the end of each sweep. For even a relatively minor separation of the traces there is a failure to generate some of the trigger pulses. The result is a loss of synchronization for each sweep during which no trigger pulse is received. Since it is the persistence of the traces that allows each beam of an oscilloscope to be used in the display of multichannel inputs, the loss of sweep causes a flickering of the traces that becomes pronounced as the loss of sweep increases. If the separation of the traces becomes sufficiently great, the trigger circuitry cannot recover at all and there is a complete loss of synchronism.

Accordingly, it is an object of the invention to facilitate the control of devices which use a single, recurrent sweep in representing the waveforms of more than one input. Another object is to prevent changes in the settings of a control from interfering with the representation of waveforms by a multichannel device.

A related object is to achieve a relatively wide separation of traces in a multichannel display device without detriment to the display. An associated object is to prevent adjustments of the vertical position controls in dual-channel oscilloscopes from interfering with sweep synchronization.

SUMMARY OF THE INVENTION

In accomplishing the foregoing and related objects, the invention provides for representing single channel or multichannel inputs by generating, with respect to the inputs, at least two independent control signals for an output device such as an oscilloscope or an oscillograph. One of the control signals is generated in accordance with a first characteristic of the input, such as amplitude, while another of the control signals represents a second characteristic, such as time position. Since the control signals are independently generated with respect to the inputs, a change in one control signal does not affect the other.

In the case of a single channel input, the independent second control signal represents the second characteristic, for example time position, with reference to a prescribed value of the first characteristic, for example a specified input amplitude level. Hence, the second control signal which, e.g., provides a time base with reference to a particular input level is not affected by changes in the independently generated first control signal.

For multichannel inputs, the output device produces at least one sweep with respect to a display surface during each cycle of operation, and the control signals are generated by the selected switching of the channels. This switching does not affect the independence of the control signals so that an adjustment of one does not disturb the other. Furthermore, switching can take place for the units associated with the generation of one control signal without requiring corresponding switching of the units used in generating the other control signal.

In accordance with one aspect of the invention, applicable to a cathode-ray oscilloscope with at least a single channel, the first control signal is generated by vertical deflection circuitry which includes a control for adjusting the position of the display on the face of a cathode-ray tube. The second control signal is independently generated by horizontal deflection circuitry which includes a level control for triggering the cathode-ray beam with reference to a prescribed amplitude level of the input. Consequently, a change in display position does not bring about a change in the level at which triggering takes place.

In accordance with another aspect of the invention, applicable to a multichannel cathode-ray oscilloscopes, the first control signal is generated by vertical deflection circuitry which includes a switchable, vertical deflection modulator for the various channels, while the second control signal is generated by horizontal deflection circuitry which includes a switchable trigger modulator.

Included in the vertical deflection modulator is a separate amplifier for each channel and a separate position control associated with it. The trigger modulator likewise includes a separate amplifier for each channel.

Both the trigger modulator and the vertical deflection modulator have separate switches for the various channels. These switches, desirably are formed by diode gates which are selectively operated from a mode-control network to determine the way in which the channel inputs are displayed and the kind of triggering employed.

In accordance with a further aspect of the invention the display is triggerable with respect to the particular input being displayed, whether a single or a multiple input is involved, or to a prescribed input.

BRIEF DESCRIPTION OF THE DRAWINGS

Other aspects of the invention will become apparent after considering an illustrative embodiment, taken in conjunction with the drawing in which.

DESCRIPTION OF AN ILLUSTRATIVE EMBODIMENT

Figure 1:
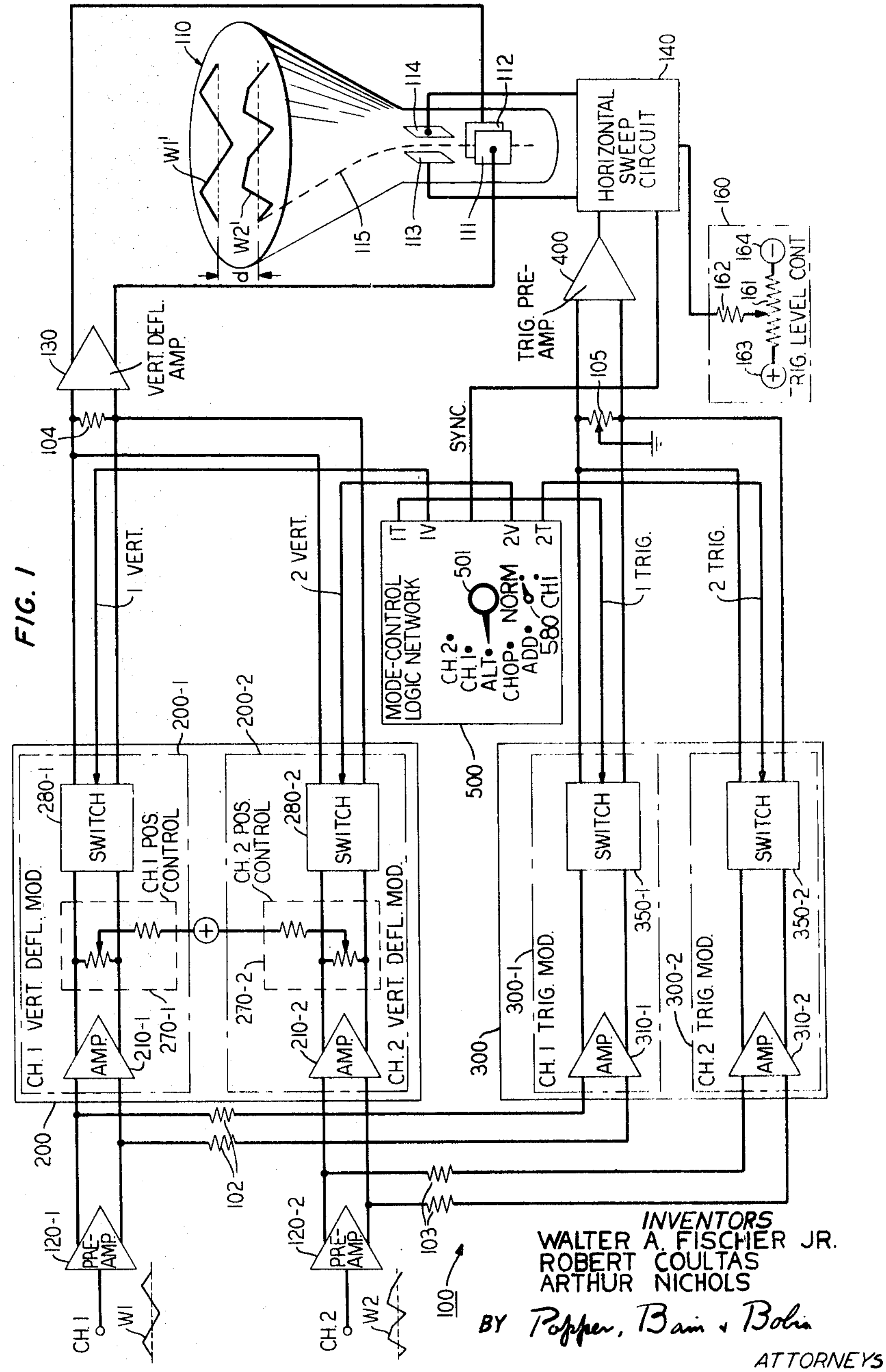
FIG. 1 is a block and schematic diagram of a display system in accordance with the invention.

Turning to the drawings, the system 100 of FIG. 1 provides for the controlled display of waveforms from a single input, or a multiplicity of inputs, on the face of a cathode-ray tube 110 under the joint control of vertical deflection circuitry and horizontal deflection circuitry. The inputs are applied to either or both of two channels CH1 and CH2. Illustratively, the channels CH1 and CH2 carry inputs with distinctively different waveforms W1 and W2 whose counterpart waveforms W1' and W2' are shown in the display device 110.

Each channel CH1 or CH2 extends from a regular preamplifier 120–1 or 120–2 to a standard vertical deflection amplifier 130 through a vertical deflection modulator 200, which has constituents 200–1 and 200–2 for the respective channels. The vertical deflection modulator 200 is operated from a mode-control logic network 500 in accordance with the type of display that is desired. Representative details of channel 1 vertical deflection modulator 200–1 , which is similar to the channel 2 vertical deflection modulator 200–2, are set forth in FIG. 2. In the drawings the initial digit of each set of reference characters indicates the FIG. where the corresponding component or a constituent is shown in detail.

Beyond the vertical deflection modulator 200, the output of the vertical deflection amplifier 130 is applied as a control signal to vertical deflection plates 111 and 112, which are horizontally positioned in the tube 110.

Both the vertical deflection amplifier 130 and the tube 110 are of conventional design. The amplifier 130 also includes whatever delay circuitry is required for the proper operation of the system 100. The tube 110 has associated with it standard circuitry (not shown), such as that used for selectively blanking the cathode-ray beam 115 in accordance with conventional practice to prevent switching transients from affecting the display. The representation of the cathode-ray beam 115 is symbolic only and is illustratively shown in a trace position at the beginning of the sweep for the waveform representation of the signal applied to channel CH2.

In addition to the vertical deflection control signal from the amplifier 130, a sweep control signal is applied to the cathode-ray tube 110 from a horizontal sweep circuit 140, to horizontal deflection plates 113 and 114, which are vertically positioned in the tube 110. The sweep circuit 140 includes such standard constituents (not shown) as a trigger amplifier, a level comparator, a sweep-gate multivibrator, a sweep generator and a horizontal deflection amplifier.

Figures 2, 3, 4:
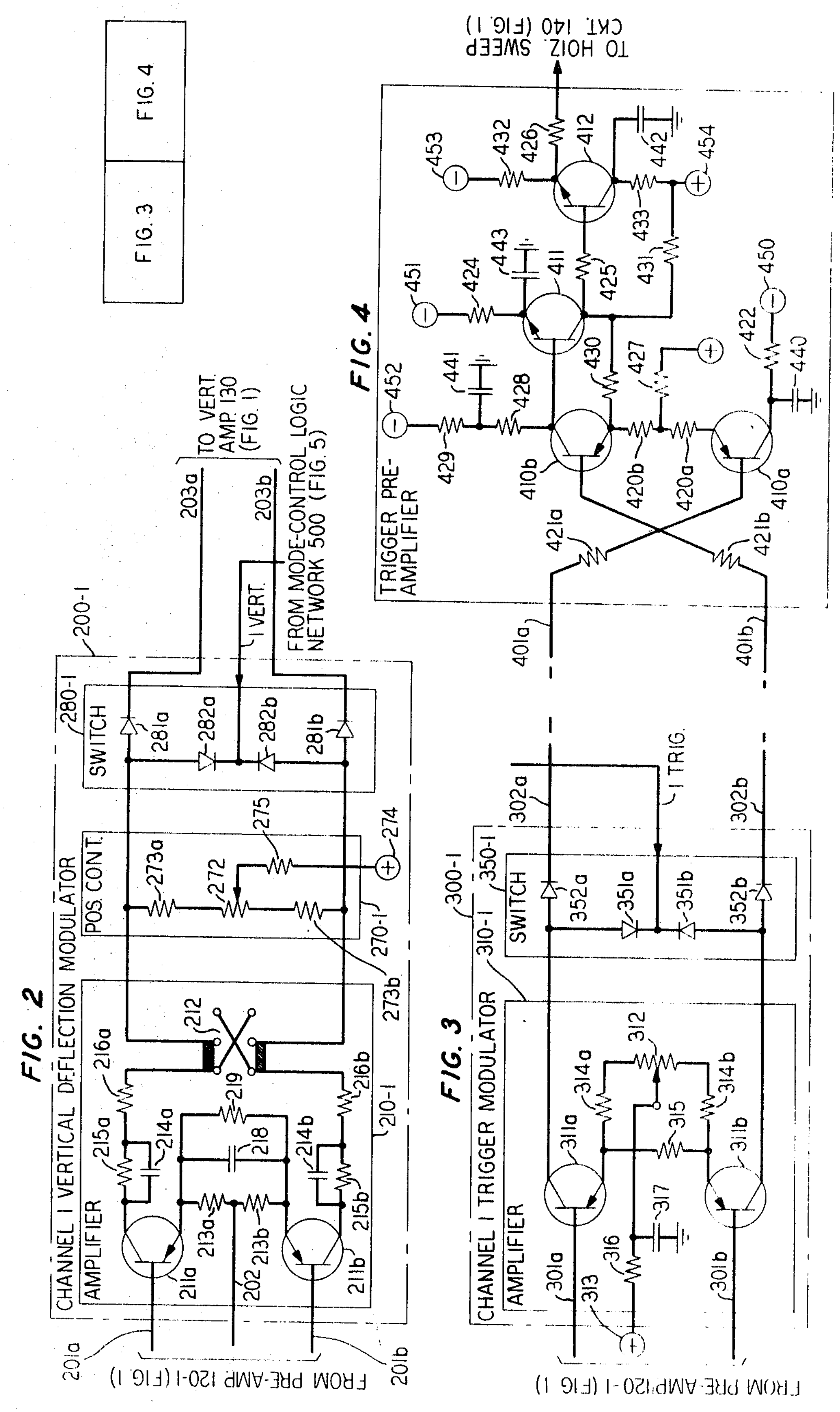
FIG. 2 is a schematic diagram of a single channel portion of a vertical deflection modulator for the system of FIG. 1.
FIG. 3 is a schematic diagram of a single channel portion of a trigger modulator for the system of FIG. 1.
FIG. 4 is a schematic diagram of a trigger preamplifier for the system of FIG. 1.

Furthermore, the horizontal sweep circuit 140 is synchronizable, i.e. triggerable, with respect to the inputs by way of a trigger preamplifier 400 through a trigger modulator 300 which has constituents 300–1 and 300–2 for the respective channels CH1 and CH2. The trigger modulator 300 is operated from the mode-control logic network 500 in accordance with the channel with respect to which triggering is to take place. The channel 1 trigger modulator 300–1 which is similar to the channel to 2 modulator 200–2, is detailed in FIG. 3. Details of the trigger preamplifier 400 are shown in FIG. 4.

Operation of the modulators 200 and 300 by the selective control of constituents 200–1 and 2 and 300–1 and 2 is determined in part by the setting of selector switches 501 and 580 of the mode-control logic network 500.

For the particular setting of the selector switch 501 in the ALT ("alternate") position shown in FIG. 1, the trace on the face of the tube 110 interchanges between channel CH1 and channel CH2 on alternate sweeps of the horizontal sweep circuit 140. A dual-beam effect is created by virtue of the persistence of each trace, with waveforms W1' and W2' corresponding to the input waveforms W1 and W2. Details of the mode-control logic network 500 are discussed subsequently.

As shown in FIG. 1, the two traces W1' and W2' are separated by an illustrative relative displacement *d* despite the fact that the traces are produced by a single beam 115. This is due to the diverse settings of the position controls 270–1 and 270–2 in the vertical deflection modulator 200. Moreover, the input level at which triggering takes place is governed by a trigger level control 160, associated with the horizontal sweep circuit 140, independently of the settings of the position controls 270–1 and 270–2. For the particular traces W1' and W2' on the face of the tube 110 in FIG. 1, triggering takes place at the zero amplitude level of the applied inputs. By adjusting the trigger level controller 160, the triggering can be set to an arbitrary input level at which the traces of the displayed waveforms would commence.

By contrast with the invention, in multichannel oscilloscopes where sweep synchronization takes place with respect to the output of a vertical deflection amplifier, such as the amplifier 130, or equivalent, even a moderate separation of the traces for alternate channels tends to cause intermittent triggering. For wide separation of the traces there is a possibility of complete loss of synchronism.

In accordance with the invention, however, the operation of the trigger circuitry, including the trigger preamplifier 400, is completely independent of the settings of the position controls 270–1 and 270–2, and the kind of intermittent triggering that leads to flicker and even complete loss of synchronism is totally eliminated.

Moreover, the kind of triggering employed by the system 100 of FIG. 1 is desirable in single-channel operation (where the various modulators 200 and 300 are completely eliminated). The trigger level control 160 for the horizontal sweep circuit 140 continues to operate from the input, instead of the vertical deflection amplifier, so that a change in the position of the trace (by adjustment of a vertical position control) has no effect on the trigger level control, which therefore does not need to be readjusted.

It is to be noted that the transmission paths for the trigger control signals are isolated at the inputs of the channels CH1 and CH2 from the associated transmission paths for the vertical deflection control signals by respective sets of isolating resistors 102 and 103. The outputs of the vertical deflection and trigger modulators 200 and 300 appear at respective resistors 104 and 105.

In a tested model of the invention, the values of representative components shown in FIG. 1 were in accordance with TABLE I.

TABLE I

| Component | | Value |
|---|---|---|
| Resistors | 102 | 100 Ohms |
| | 103 | 100 |
| | 104 | 187 |
| | 105 | 200 |

Table I – Continued

| | | |
|---|---|---|
| | 161 | 5,600 |
| | 162 | 15,000 |
| Source | 163 | +15 Volts |
| | 164 | -16 |

Representative component values for other constituents of the system are set forth in additional tables below.

Vertical Deflection Modulator

Turning to FIG. 2 and the details of the vertical deflection modulator constituent 200–1 for channel CH1, an output replica of the amplified waveform W1, from the preamplifier 120–1 (FIG. 1), is applied between terminals **201*a* and 201*b* of an amplifier 210–1**.

The amplifier 210–1 is of balanced design with junction transistor amplifier **211*a* and 211*b* connected to respective input leads 201*a* and 201*b*. A third input lead 202, connected to the point of symmetry of the amplifier 210–1, also extends in conventional fashion to the amplifier 210–1**, but has been omitted from FIG. 1 for simplicity.

In addition to the constituents shown in FIG. 2, the amplifier 210–1 can include additional circuit packages (not shown) of variable resistors and capacitors to provide, for example, high frequency compensation and deflection sensitivity control. A reversing switch 212 is used to interchange the output leads.

The next constituent of the vertical deflection modulator 210–1 is the vertical position control 270–1, which includes a potentiometer 272 with auxiliary resistors **273*a* and 273*b* branching across the output leads 203*a* and 203*b*. The movable arm of the potentiometer 272 extends to a voltage source 274 through a resistor 275**. The setting of the arm determines the vertical position of the trace corresponding to the channel CH1 signal, e.g. the base line of the illustrative waveform W1′.

Operation of the modulator 210–1 is governed by the polarity of the signal applied to the switch 280–1. Forming the switch 280–1 are routing diodes **281*a* and 281*b* in the respective leads 203*a* and 203*b*, and oppositely poled branch diodes 282*a* and 282*b*. The switch diodes are connected so that their anodes are all connected to one end or the other of the position control 270–1. When the signal on the line 1 VERT from the mode-control network 500 (FIG. 5) is of positive polarity, the branch diodes 282*a* and 282*b* are reversed-biased and behave as open circuits, so that there is an output from the amplifier 210–1 on the leads 203*a* and 203*b*. However, when the signal on the line 1 VERT is negative, the branch diodes 282*a* and 282*b* act as short circuits and no output from the amplifier 210–1 appears on the leads 203*a* and 203*b***.

In a tested model of the invention the values of representative components in the amplifier 210–1 and the position switch 270–1 were in accordance with TABLE II.

TABLE II

| Component | | Value or Type |
|---|---|---|
| Resistors | 213*a* & *b* | 620 Ohms |
| | 215*a* & *b* | 300 |
| | 216*a* & *b* | 100 |
| | 219 | 221 |
| | 272 | 5,000 |
| | 273*a* & *b* | 510 |
| | 275 | 15,000 |
| Capacitors | 214*a* & *b* | 0.001 Microfarads |
| | 218 | 2.7 |
| Source | 274 | +100 Volts |
| Transistors | 211*a* & *b* | 2N3640 |

Trigger Modulator

Details of a representative trigger modulator constituent 300–1 for channel CH1 are shown in FIG. 3. This unit is similar to its associated deflection modulator constituent 200–1, except for the omission of the position control 270–1.

In particular, the modulator 300–1 includes an amplifier 310–1 and switch 350–1. The amplifier unit has input leads **301*a* and 301*b* which connect to the preamplifier 120–1 through a pair of isolating resistors 102 (FIG. 1). A similar pair of isolating resistors 103 is used in isolating the channel 2 trigger modulator constituent 300–2 from the associated channel 2 vertical deflection modulator constituent 200–2**.

The input leads **301*a* and 301*b* extend to respective junction transistors 311*a* and 311*b*. A potentiometer 312, with its arm connected to a voltage source 313**, provides balance for the channel.

In the switch 350–1 the diodes **351*a*, 351*b*, 352*a* and 352*b* function in the same manner as their counterparts in the switch 280–1 of FIG. 2, except that the signal from the mode-control network 500 appears on an appropriate line 1** TRIG.

Representative values for the components in the amplifier 310–1 for a tested embodiment of the invention were as given in TABLE III.

TABLE III

| Component | | Value or Type |
|---|---|---|
| Resistor | 312 | 200 Ohms |
| | 314*a* & *b* | 910 |
| | 315 | 200 |
| | 316 | 47 |
| Capacitor | 317 | 0.02 Microfarads |
| Source | 313 | +15 Volts |
| Transistors | 311*a* & *b* | 2N4916 |

Trigger Pre-Amplifier

The trigger preamplifier 400 is detailed in FIG. 4. This unit converts a balanced input into an unbalanced output which is used in the horizontal sweep circuit 140 to generate trigger pulse signals.

Within the amplifier 400, junction transistors **410*a* and 410*b* receive the balanced input and transistor 410*b* acts in conjunction with junction transistor 411 to provide two stages of amplification, with negative feedback, for a final stage of amplification provided by junction transistor 412**.

Representative values for the components of the trigger amplifier 400 in a tested embodiment of the invention were as shown in TABLE IV.

TABLE IV

| Component | | Value or Type |
|---|---|---|
| Resistors | 420*a* & *b* | 24.9 Ohms |
| | 421*a* & *b*, 422, 424, 425, 426 | 47 |
| | 427, 428, 429 | 1,000 |
| | 430 | 301 |
| | 431 | 39,000 |
| | 432 | 3,000 |
| | 433 | 2,000 |
| Capacitors | 440, 441, 442 | 0.2 Microfarads |
| | 443 | 51 |
| Sources | 450 & 451 | −5 Volts |
| | 452 & 453 | − 15 |
| | 454 | +15 |
| Transistors | 410*a* & *b* | 2N4916 |
| | 411 & 412 | 2N3563 |

Mode-control Logic Network

Figure 5:
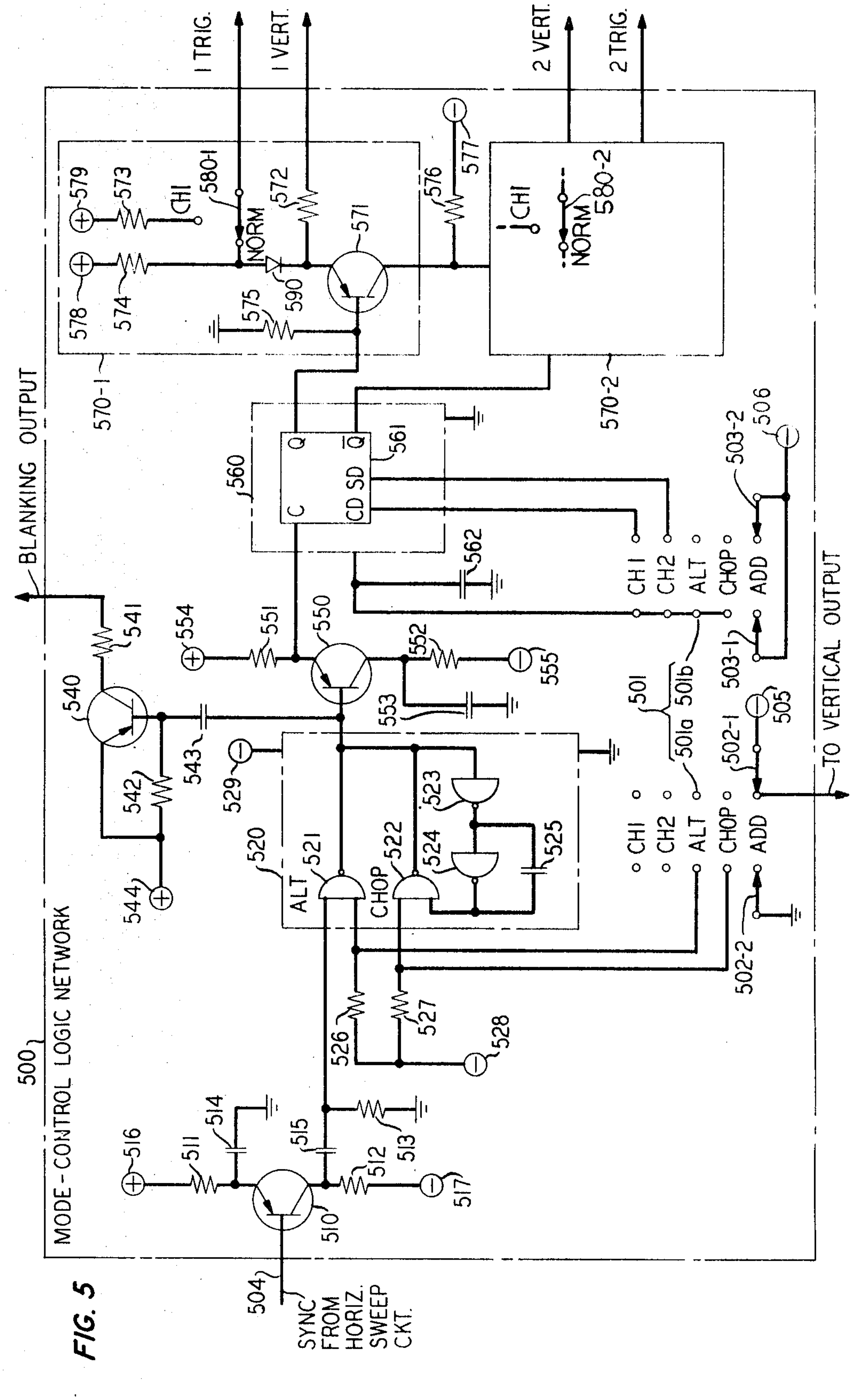
FIG. 5 is a block and schematic diagram of a mode-control logic network for the system of FIG. 1.

Details of the mode-control logic network 500 are set forth in FIG. 5. This network controls the switching of the various modulators in accordance with the setting of a selector switch 501, which is in two sections **501*a* and 501*b* for respective circuit packages 520 and 560**.

Each section of the switch 501 operates by the simultaneous movement of two sliders 502–1 and 502–2 for section **501*a*, and corresponding sliders 503–2 and 503–2 for section 501*b***, to any of five positions: CH1, CH2, ALT, CHOP and ADD.

Beginning with the lowermost position ADD, this setting allows the waveforms on channels CH1 and CH2 to be additively combined in the vertical deflection resistor 104 (FIG. 1) so that the trace (not shown) on the face of the cathode-ray tube 110 is s summation of the two waveforms.

The next position CHOP results in the generation of a relatively high frequency switching signal which brings about a rapid switching between channels CH1 and CH2 during each trace. The result is a dual-trace pattern which is somewhat similar in appearance to that illustrated on the face of the cathode-ray tube in FIG. 1 for the ALT ("alternate") mode, except that the sweep is synchronized with respect to the input of a single channel CH1 as explained subsequently.

By contrast with the ALT setting, the CHOP setting is desirable with low sweep rates in order to reduce the flicker of the display caused by an occasional loss of trigger signal.

Beyond the ALT position, there are successive positions CH1 and CH2 to enable either channel CH1 or channel CH2 to be used alone.

The logic network 500 operates with respect to a synchronizing input, which is applied to a lead 504 from the horizontal sweep circuit 140 (FIG. 1). The synchronizing signal is amplified by the junction transistor 510 and applied to circuit package 520.

The circuit package 520 is biased from a source 529 which is shown, along with ground, as having a general connection to the package. The latter includes a plurality of NAND gates (for positive logic) in which the logic function is written:

$C=\overline{A.B}$ where $A$ and $B$ are inputs, and $C$ is the output.

Where a NAND gate has but a single input, it serves as an inverter. The logic convention used in FIG. 5 (for positive logic) is that a negative input is a logical "0," while a positive or grounded input is a logical "1."

Considering the effect of the ALT setting, the section **501*a* of the switch 501 causes a ground connection (logical "1") to be applied to the gate 521 (from the grounded post of the slider 520–2). Consequently there will be a negative output (logical "0") when a positive going voltage (logical "1") is applied to the other terminal of the gate 521 from the amplifying transistor 510. This output, which changes on alternate sweeps of the circuit 140, is applied to a transistor 540 to provide a blanking output as discussed later. In addition, the output is also applied through a second transistor 550 to a second circuit package 560, which, like the package 520**, is shown as having general bias and ground connections.

The principal constituent of the second circuit package 560 is clocked flip-flop 561 with input leads C, CD and SD and output leads Q and $\bar{Q}$. Lead C is for clock, i.e. periodic inputs; lead CD is for direct clearing of the flip-flop; while lead SD is for direct setting of the flip-flop.

The principal output is on lead Q, while the complementary output is on lead $\bar{Q}$. When the output of the flip-flop 561 is negative, i.e. a logical "0," on the principal lead Q, the complementary output on the lead $\bar{Q}$ is at ground, i.e. a logical "1."

With section **501*b* of the switch 501 on the ALT setting, bias voltage is applied to the flip-flop 561 through the slider arm 503–1 from a source 506. Consequently the output of the flip-flop 561 interchanges for every sweep cycle and acts upon switch control units 570–1 and 570–2** for respective channels CH1 and CH2.

The constituents of the control unit 570–1 for channel CH1 are shown in detail in FIG. 5. There are two output leads 1 TRIG and 1 VERT which extend, respectively, to the trigger modulator switch 350–1 (FIGS. 1 and 3) and the vertical deflection modulator switch 280–1 (FIGS. 1 and 2).

When the principal output Q of the flip-flop 561 is at ground level (logical "1"), the transistor 571 of the control unit 570–1 is cut off and the outputs to both the 1 TRIG and the 1 VERT leads are positive. This causes the modulator switches 350–1 and 280–1 to be "closed" so that the channel CH1 signals reach the respective vertical deflection amplifier 130 and the trigger preamplifier 400.

However, when the outputs of the flip-flop 561 are interchanged, and Q becomes negative (logical "0") the transistor 571 of the control unit 570–1 becomes conductive and the outputs to the leads 1 TRIG and 1 VERT are negative. The result is that the modulator switches 350–1 and 280–1 are "open" so that the channel CH1 signals are cut off. In their place, however, are the channel CH2 signals. Consequently, the traces of alternate channels appear on alternate cycles and are synchronized with respect to their corresponding inputs.

In the above described ALT mode, triggering occurred for channel CH1 when CH1 was displayed and for channel CH2 when CH2 was displayed. In order to provide dual-channel operation, but triggering on channel CH1 only, trigger mode control 580 biases trigger modulator switch 350–1 "closed" and trigger modulator switch 350–2 "open." In this mode, an event occurring on signal W2 can be measured in time from an event occuring on signal W1.

Returning to further consideration of the CHOP setting, that causes logic gate 522 of logic package 520 to be enabled on one of its input leads. This applies an input to an inverter 523, which in turn acts on a second inverter 524 that is shunted by a capacitor 525. Because of the capacitor 525 the gates 522 through 524 act as a multivibrator oscillating at a frequency determined by the value of the capacitor. The consequence is that a blanking output appears to prevent the switching transients from appearing in the output trace. In addition for the CHOP mode of operation, the switch 580 (in the unit 570–1) should be set to its channel 1 position so that the trace is synchronized from channel CH1 alone.

The remaining settings of the selector switch 501 have no influence on the constituents of the circuit package 520. However, they do control the respective direct-set and direct-clear inputs of the flip-flop 561 in the second package 560. In the direct-set position CH1, the principal output Q is a logical "1" so that the transistor 571 of the switch unit 570–1 is cut off, and channel CH1 is operative; conversely when the selector switch is in the direct-clear position CH2, channel CH2 is operative.

In a tested embodiment of the invention the various constituents of the mode-control logic network 500 of FIG. 5 had representative values indicated in TABLE V.

TABLE V

| Component | Value or type |
|---|---|
| Resistor: | |
| 511, ohms | 15,000 |
| 512, 574, ohms | 10,000 |
| 513, ohms | 7,500 |
| 541, 552, ohms | 2,000 |
| 542, 573, ohms | 1,000 |
| 551, ohms | 5,100 |
| 572, ohms | 10 |
| 575, ohms | 680 |
| 576, ohms | 270 |
| Capacitor: | |
| 514, microfarads | 41 |
| 515, 553 and 562, microfarads | 0.02 |
| 525, microfarads | 430 |
| 543, microfarads | 100 |
| Sources: | |
| 516, 544, 554 and 578, volts | +15 |
| 505, 517, 555, 577, 579, volts | −15 |
| 506, volts | −5 |
| Transistors: 510, 540, 550 and 571 | 2N4916 |
| Int. circuit: | |
| 520 | DTμL 946 |
| 560 | DTμL 9948 |

In addition, in the tested embodiment the circuit packages 520 and 560 took the form of integrated circuit modules.

While various aspects of the invention have been set forth by the drawings and the specification, it is to be understood that the foregoing detailed description is for illustration only and that various changes in circuitry, as well as the substitution of equivalent constituents for those shown and described, may be made without departing from the spirit and scope of the invention as set forth in the appended claims.

What we claim is:

1. Apparatus for selectively representing the waveforms of a plurality of applied inputs, which comprises:

an output device including means for producing at least one sweep with respect to a display surface during each cycle of operation;

means responsive to at least one of the inputs for generating a first control signal for said output device in accordance with a first characteristic of said inputs;

means independently responsive to at least one of said inputs for generating a second signal to represent a second characteristic of said inputs and control said sweep;

and means for selectively controlling the operation of the first generating means and the second generating means;

whereby the first and second control signals act upon said output device to produce the desired representation of said inputs.

2. Apparatus as defined in claim 1 wherein:

said output device is a cathode-ray tube producing at least one electron beam for the display of said waveforms;

said first generating means includes multichannel vertical deflection circuitry for said electron beam;

said second generating means oscilloscope multichannel horizontal deflection circuitry for sweeping said electron beam;

and the controlling means includes means for establishing prescribed intervals and operating sequences for the channels of said vertical deflection circuitry and said horizontal deflection circuitry;

thereby to achieve flexibility in the display of said waveforms.

3. A multichannel cathode-ray oscilloscope in accordance with claim 2 wherein:

said vertical deflection circuitry includes means in said channels for controlling the positions of the traces produced by said electron beam on the face of said cathode-ray tube;

and said horizontal deflection circuitry includes means for triggering the sweep of said electron beam with respect to a prescribed level of at least one of said inputs.

4. A multichannel cathode-ray oscilloscope in accordance with claim 3 wherein:

said vertical deflection circuitry includes a switchable, vertical deflection modulator for said channels;

said horizontal deflection circuitry includes a switchable trigger modulator for said channels;

and said controlling means includes means for selectively operating the switches of the modulators for said channels.

5. A multichannel cathode-ray oscilloscope in accordance with claim 4 wherein:

said vertical deflection modulator comprises a separate amplifier for each of said channels, a separate position control associated with the amplifier and a switch for each channel beyond the amplifier and position control thereof.

6. A multichannel cathode-ray oscilloscope in accordance with claim 5 wherein:

said amplifier is of balanced design and has first and second output leads;

and said switch includes a routing diode in each of said leads, a pair of oppositely poled diodes bridging from one lead to the other, and a control lead from said controlling means connected to the common point of said oppositely poled diodes.

7. A multichannel cathode-ray oscilloscope in accordance with claim 4 wherein:

said trigger modulator comprises a separate amplifier for each of said channels, and a switch for each channel beyond the amplifier thereof.

8. A multichannel cathode-ray oscilloscope in accordance with claim 7 wherein:

said amplifier is of balanced design and has first and second output leads;

said switch includes a routing diode in each of said leads, a pair of oppositely poled diodes bridging from one lead to the other and a control lead from said controlling means connected to the common point of said oppositely poled diodes.

9. A multichannel cathode-ray oscilloscope in accordance with claim 4 wherein:

said vertical deflection modulator includes a switch for each channel;

said trigger modulator includes a switch for each channel;

and said controlling means comprises means for (1) operating the switches of said vertical deflection modulator with respect to the particular input to be displayed during each sweep cycle and (2) operating the switches of said trigger modulator according to the input to be displayed, or another prescribed input.

10. A multichannel cathode-ray oscilloscope in accordance with claim 9 wherein said controlling means comprises:

a flip-flop having principal and complementary outputs and regular, direct-set and direct-clear inputs;

said principal output being connectable to control the switches of one channel;

said complementary output being connectable to control the switches of another channel;

said regular input being connectable to a cyclically operating source to cause a cyclic interchange of the principal and complementary output signals;

and said direct-set input and said direct-clear input being selectively connectable to respectively set and clear said flip-flop 11. A multichannel cathode-ray oscilloscope in accordance with claim 10 wherein:

said controlling means includes first and second control units connected to respective outputs of said flip-flop:

each control unit containing an auxiliary switch for selectively controlling the switches of said trigger modulator to operate with respect to a prescribed channel of said flip-flop.

12. A multichannel cathode-ray oscilloscope in accordance with claim 10 wherein:

said controlling means further includes means for selectively generating a cyclic signal for the regular input of said flip-flop at the sweep rate of said oscilloscope or at a higher rate.

13. Apparatus for representing the waveform of an applied input which comprises:

an output device;

means responsive to the input for generating a first control signal for said output device in accordance with a first characteristic of said input;

means independently responsive to said input for generating a second control signal for said output device to represent, with reference to a prescribed value of said first characteristics, a second characteristic of said input;

whereby the first and second control signals act upon said output device to produce the desired representation of said input;

said output device produces a two-dimensional representation;

said first control signal governs the vertical dimension of said waveform in accordance with the amplitude characteristic of said input;

and said second control signal governs the horizontal dimension of said waveform to represent, in accordance with a prescribed value of input amplitude, the time characteristic of said input;

said output device is a cathode-ray tube;

the first mentioned generating means includes vertical deflection circuitry for said cathode-ray tube, and the second mentioned generating means includes horizontal deflection circuitry for said cathode-ray tube;

said vertical deflection circuitry includes a means for controlling the position of said waveform on the face of said cathode-ray tube;

and said horizontal deflection circuitry includes means for controlling the triggering thereof with respect to a prescribed amplitude level of said input;

said cathode-ray tube has vertical and horizontal deflection plates therein;

said vertical deflection circuitry includes an amplifier associated with the position control means and interconnecting the input with the vertical deflection plates;

said horizontal deflection circuitry includes a comparator associated with the trigger level control means and interconnecting said input with the horizontal deflection plates;

said vertical deflection circuitry includes first and second channels and means for selectively switching therebetween, and said horizontal means includes first and second channels and means for selectively switching therebetween;

and further including means for controlling the switching of said channels.